No. 676,742. Patented June 18, 1901.
Z. T. FURBISH.
CHUCK.
(Application filed Feb. 28, 1901.)
(No Model.)

Witnesses:—
Frank L. G. Graham.
Wm. A. Barr.

Inventor:
Zachry T. Furbish,
by his Attorneys:
Howson & Howson

UNITED STATES PATENT OFFICE.

ZACHRY T. FURBISH, OF PHILADELPHIA, PENNSYLVANIA, ASSIGNOR TO NORTH BROTHERS MANUFACTURING COMPANY, OF SAME PLACE.

CHUCK.

SPECIFICATION forming part of Letters Patent No. 676,742, dated June 18, 1901.

Application filed February 28, 1901. Serial No. 49,270. (No model.)

*To all whom it may concern:*

Be it known that I, ZACHRY T. FURBISH, a citizen of the United States, residing in Philadelphia, Pennsylvania, have invented certain Improvements in Chucks, of which the following is a specification.

My invention relates to certain improvements in chucks for attaching bits to spindles of ratchet screw-drivers and drills.

The object of my invention is to so construct the chuck that a split ring can be used to couple the bit to the chuck.

Figure 1:
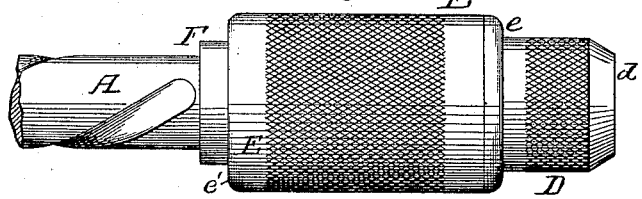
Figure 2:
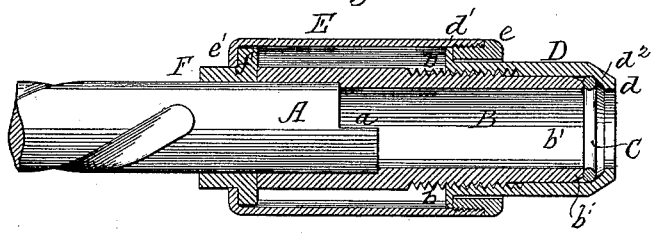
Figure 3:
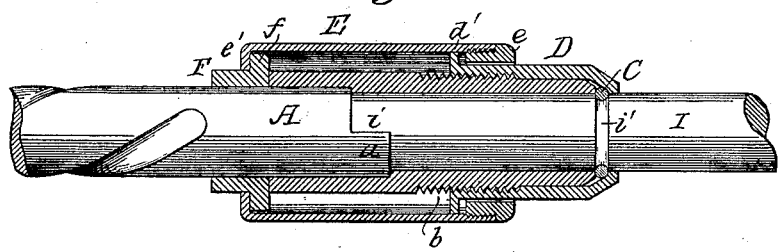
Figure 4:
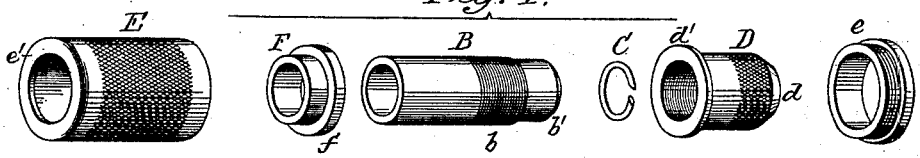
Figure 5:

In the accompanying drawings, Figure 1 is a view of my improved chuck. Fig. 2 is a longitudinal sectional view with the bit detached. Fig. 3 is a view similar to Fig. 2 with the bit secured to the chuck. Fig. 4 is a perspective view showing the elements of the chuck detached, and Fig. 5 is a view of a bit.

A is the spindle of a ratchet screw-driver or drill having a spiral groove, which is engaged by the ratchet mechanism to turn the spindle. While I have shown this form of spindle in the present instance, any form of spindle may be used, and in some instances the spindle may be shaped to fit a lathe or drill head; but my invention is especially applicable to small chucks used to attach bits or drills to hand-operated tools.

B is a tubular body portion secured to the spindle A in any suitable manner. The spindle in the present instance extends into this tubular body and has a shoulder $a$, with which engages a shoulder $i$ at the end of the bit I, as clearly shown in Figs. 3 and 5.

The tubular body B has an external threaded portion $b$, with which meshes the threaded portion of a sleeve D. This sleeve has an internal flange $d$ at its outer end, and this flange has an inclined wall $d^2$, as clearly shown in Figs. 2 and 3.

Mounted between the end $b'$ of the body B and the internal flange $d$ is a split ring C. By turning the sleeve D on the screw-threaded portion $b$ of the body B the inclined portion $d^2$ of the sleeve will contract the split ring C, making it less in diameter, and consequently forcing it into the cavity $b'$ for the bit I, and if the bit is in position, as shown in Fig. 3, the ring will enter the groove $i'$ in the bit and retain the bit in the chuck, and as the shoulder $i$ of the bit engages the shoulder $a$ on the spindle the bit must necessarily turn with the chuck. The ring is preferably made of spring metal, so that as soon as the sleeve D is turned in the opposite direction from that above described the inclined wall $d^2$ of the sleeve will be drawn away from the spring-ring, and the ring will immediately expand into the space between the end $b'$ of the body and the internal flange $d$ and will be clear of the bit, so that the bit can be readily removed.

In order to protect the screw-thread $b$ and to limit the outward movement of the sleeve D, I provide a shell E. This shell has an internal screw-thread at its outer end, into which is screwed a ring $e$. The opposite end of the shell E has an internal flange $e'$, resting back of a flange $f$ on the ring F, mounted on a spindle A.

The sleeve D has an external flange $d'$, which rests back of the ring $e$ and within the cavity formed by the shell E. By this construction the screw-thread is protected and the downward movement of the sleeve is limited.

In assembling the chuck the ring F is first placed on the spindle A, the body B is then secured to the spindle, the split ring is placed in position, and the sleeve D is screwed onto the threaded portion of the body, after which the shell E is slipped over the ring and body from the opposite end and the ring $e$ is screwed into the shell, thus securing the several parts together. In some instances the shell may be screwed onto the ring F and an internal flange may be substituted for the ring $e$.

I claim as my invention—

1. The combination in a chuck, of a body portion having a central passage for the bit, a sleeve having an internal tapered flange, a split ring mounted between the flange and the end of the body portion so that on moving the sleeve on the body portion the ring will be contracted, and a portion of the ring will be forced into the central passage for the bit, substantially as described.

2. The combination in a chuck, of a body portion having a central passage for a bit and having a screw-threaded portion on its periphery, means for preventing the bit from turning in the chuck, a sleeve having an internal screw-thread meshing with the screw-thread on the body and having an internal flange at one end, and a split ring mounted between said flange and the end of the body so that on turning the sleeve on the body the ring will be contracted, substantially as described.

3. The combination of a spindle having a shoulder, a body portion mounted on the spindle and having an external screw-thread, a sleeve having a screw-thread meshing with the screw-thread on the body portion and having a tapered internal flange at one end, a spring, and a split ring mounted between the end of the body and the tapered flange of the sleeve, the said parts being so arranged that the spindle having a shoulder and a groove will be confined to the chuck by the split ring and prevented from turning in the chuck by the shoulder, substantially as described.

4. The combination of a spindle, a body portion having an opening for the bit, an external screw-thread on the body, a sleeve having a screw-thread meshing with the screw-thread of the body and having an internal tapered flange, a split ring confined between the end of the body and the tapered flange, an external flange on the sleeve, and a shell inclosing a portion of the body and limiting the movement of the sleeve, substantially as described.

5. The combination of a spindle, a body portion secured thereto having an external threaded portion, a sleeve having a tapered internal flange at one end and having a thread engaging the threads on the body, a split ring mounted between the internal flange of the sleeve and the end of the body, an external flange on the sleeve, a shell, a ring screwed into the shell and forming a stop to limit the outward movement of the sleeve, and a ring mounted on the spindle back of the body, the said shell having an internal flange resting back of the ring, substantially as described.

In testimony whereof I have signed my name to this specification in the presence of two subscribing witnesses.

ZACHRY T. FURBISH.

Witnesses:
WILL. A. BARR,
JOS. H. KLEIN.